L. A. GODBOLD AND H. W. FLETCHER.
DRILL CUTTER.
APPLICATION FILED JUNE 16, 1919.

1,320,384.

Patented Nov. 4, 1919.

Louis A. Godbold
Harold W. Fletcher   Inventors

By their Attorney   Jesse R. Stone

UNITED STATES PATENT OFFICE.

LOUIS A. GODBOLD AND HAROLD W. FLETCHER, OF HOUSTON, TEXAS.

DRILL-CUTTER.

1,320,384.  Specification of Letters Patent.  Patented Nov. 4, 1919.

Application filed June 16, 1919. Serial No. 304,508.

*To all whom it may concern:*

Be it known that we, LOUIS A. GODBOLD and HAROLD W. FLETCHER, citizens of the United States, residing at Houston, Harris county, Texas, have invented a certain new and useful Improvement in Drill-Cutters, of which the following is a full, clear, and exact description, such as will enable others skilled in the art to which it appertains to make and use the same.

Our invention relates to an improvement in drill cutters for rotary boring drills used in boring wells or mines in earth, rock, or other similar formation. The invention is designed as an improvement on the previous patent to H. R. Hughes on a roller boring drill, Serial No. 979,496, patented December 27, 1910.

An object of our invention is to provide a bearing and locking means for the rotatable cutters on a roller boring drill which will be simple in structure and easily detachable.

Another object is to so construct the bushing on a drill cutter that the cutter and bushing may be assembled at the shop and readily attached to the cutter shaft in the field without being taken apart, thereby preserving the bearings clean at all times.

Figure 1:
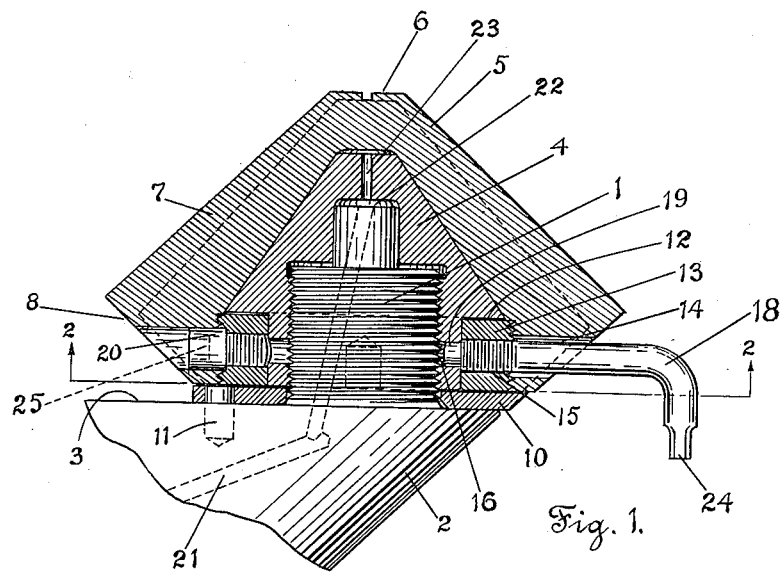
Figure 2:
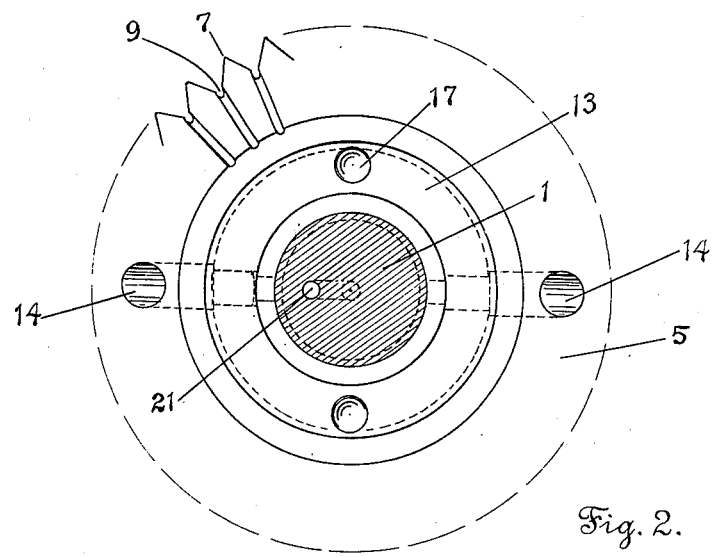

In the drawings forming a part of this specification, and wherein like parts are designated by like numerals in both the views, Figure 1 is a central longitudinal section of a cutter, and the bushing used therewith, embodying our invention. Fig. 2 is a bottom plan view, partly diagrammatic, illustrating the same taken on the line 2—2 of Fig. 1.

Our invention is adapted to be used especially with cutters so formed as to inclose the end of the cutter shaft and the bushing thereon. We have illustrated a frusto-conical shaped cutter such as is employed on the so-called Hughes cone-bit wherein the rotating cutters are approximately conical in shape. The cutter is mounted upon a shaft or pin, preferably made integral with the lower end of the head 2 of the bit. Said shaft projects inwardly from the flat face 3 of an inclined slot cut in the lower end of the bit. This shaft 1 is threaded for attachment to a tapered bushing 4, upon which the frusto-conical cutter 5 is adapted to rotate. The cutter 5 has a flattened forward end 6 and is provided with radial teeth 7 extending from the forward end 6 inward toward the head of the bit. The inner face of the cutter is also tapered, as shown at 8, and provided with slots or grooves 9 which have a slight disintegrating action upon material on the outer surface of the bore hole. Between the rotatable cutter and the flattened face 3 of the bit is provided an anti-friction washer 10. This washer is locked against rotation with the cutter by means of a dowel pin 11, said pin being flush with the face of the washer at its outer end. To provide a means for locking the cutter 6 upon the bushing 4 the inner end of the said bushing is reduced in diameter to provide a recess 12 within which an annular locking ring 13 is adapted to seat. This locking ring is threaded on its outer periphery for attachment to the inner face of the cutter 5. It has been previously customary in assembling this device to thread the bushing 4 upon the shaft 1, having first introduced the inner reduced end of the bushing 4 into the locking ring 13. When the bushing has been threaded securely upon the shaft 1 the locking ring 13 has been held stationary by means of a pin or anchoring device introduced through a passage in the head of the bit and through the washer 10. The cutter 5 was then threaded upon the locking ring 13 in an obvious manner. This has made it necessary, in putting the cutter upon the bit in the field, to expose the bushing 4 to dirt or water containing grit and mud while the cutter 5 is threaded over the end of the bushing and onto the locking ring 13.

In our present invention we form cylindrical recesses upon opposite sides of the cutter and through the locking ring and bushing. The said recess is tapered somewhat, being larger in the cutter, as shown at 14, somewhat reduced in diameter and threaded at 15 into the locking ring 13, and having a still further reduced opening 16 in the bushing, registering with the other openings. In the outer face of the locking ring 13, and at a position at right angles to the recesses 14 and 15, are bored small recesses 17 into which a spanner wrench may be inserted in order to tighten the locking ring 13 within its seat in the cutter 5.

In assembling our improved cutter the bushing 4 is inserted within the recess in the cutter, the locking ring is then threaded within its seat so as to hold the cutter rotatable upon the bushing. A small pin or wrench 18 is then inserted through the openings 14 and 15 which are registered for that purpose, the forward reduced end of the wrench 19 projecting into the opening 16 in the bushing. It will usually be necessary in inserting the wrench through the locking ring and into the bushing to rotate the cutter, with the locking ring thereon, relative to the bushing until the wrench may fit within the opening 16 in the bushing. When the wrench is thus inserted, the cutter, locking ring, and bushing are held rigidly together and may be screwed downward over the pin or shaft 1. When thus secured on said shaft, the wrench 18 is withdrawn and the holes or recesses 14 and 15 are closed by means of a set screw or locking pin 20 inserted through the opening 14 in the cutter and threaded within the recess 15 in the locking ring, thus holding the cutter and locking ring rigidly together. The head of the screw 20 is formed with a polygonal recess 25 into which a reduced end 24 of the wrench 18 may fit to operate same. The screw 20 does not enter the recess 16 in the bushing, however, so that the cutter and locking ring will be free to rotate upon the bushing and will be held against removal therefrom by the fact that the locking ring is seated within the recess 12 in the bushing.

This means of locking the cutter upon the bushing makes it possible to assemble the cutter, the bushing, and the locking ring in the shop so that there will be no danger of water or grit or other similar foreign substance obtaining entrance about the bearing surfaces upon which the cutter rotates.

The bearings are lubricated in this embodiment of our invention in the same manner as shown in the Hughes patent previously referred to. Passages 21 in the head of the bit conduct lubricant from a containing chamber down through the shaft of the pin 1 so that the same will issue at 22 upon the inner surface of the bushing and will pass through a smaller duct or channel 23 upon the outer surface of the bushing and thus serve to keep the bearing surfaces supplied with lubricant at all times.

Having thus described our invention, the further objects and advantages of which will be obvious, what we claim as new and desire to protect by Letters Patent is:

1. In a device of the character described a rotatable cutter, said cutter being provided with a tapered bearing recess on its inner face, a tapering bushing adapted to fit therein, a locking ring threaded on the inner face of said cutter, and fitted within an annular recess in said bushing, said bushing being provided with a threaded recess for attachment to a cutter shaft and means to temporarily lock said cutter, locking ring and the bushing non-rotatably together for the purpose described.

2. In a device of the character described, a bushing, a cutter surrounding said bushing, a locking ring fitting within a recess in said bushing and secured to said cutter, said cutter, locking ring, and bushing having opposite openings therein, said openings adapted to be registered to receive a retaining pin and a set screw adapted to fit within the opening in said cutter and to be threaded into said locking ring to close said opening when desired.

3. In a device of the character described, a cutter shaft, a bushing, threaded thereon, a cutter inclosing the end of said bushing and shaft, a locking ring to secure said cutter rotatably on said bushing and means to screw or unscrew said bushing on to or from said shaft while said cutter is mounted thereon.

4. In a device of the character described, a cutter shaft, a bushing, a cutter fitted over and inclosing one end of said bushing, means to lock said cutter rotatably on said bushing and means to attach or detach said bushing on said shaft while the cutter is locked thereon.

In testimony whereof, we hereunto affix our signatures this the 6 day of June, 1919.

LOUIS A. GODBOLD.
HAROLD W. FLETCHER.

Correction in Letters Patent No. 1,320,384.

It is hereby certified that in Letters Patent No. 1,320,384, granted November 4, 1919, upon the application of Louis A. Godbold and Harold W. Fletcher, of Houston, Texas, for an improvement in "Drill-Cutters," an error appears in the printed specification requiring correction as follows: Page 2, line 80, claim 3, after the word "bushing" strike out the comma; and that the said Letters Patent should be read with this correction therein that the same may conform to the record of the case in the Patent Office.

Signed and sealed this 6th day of January, A. D., 1920.

[SEAL.]

M. H. COULSTON,
*Acting Commissioner of Patents.*

Cl. 255—71